UNITED STATES PATENT OFFICE.

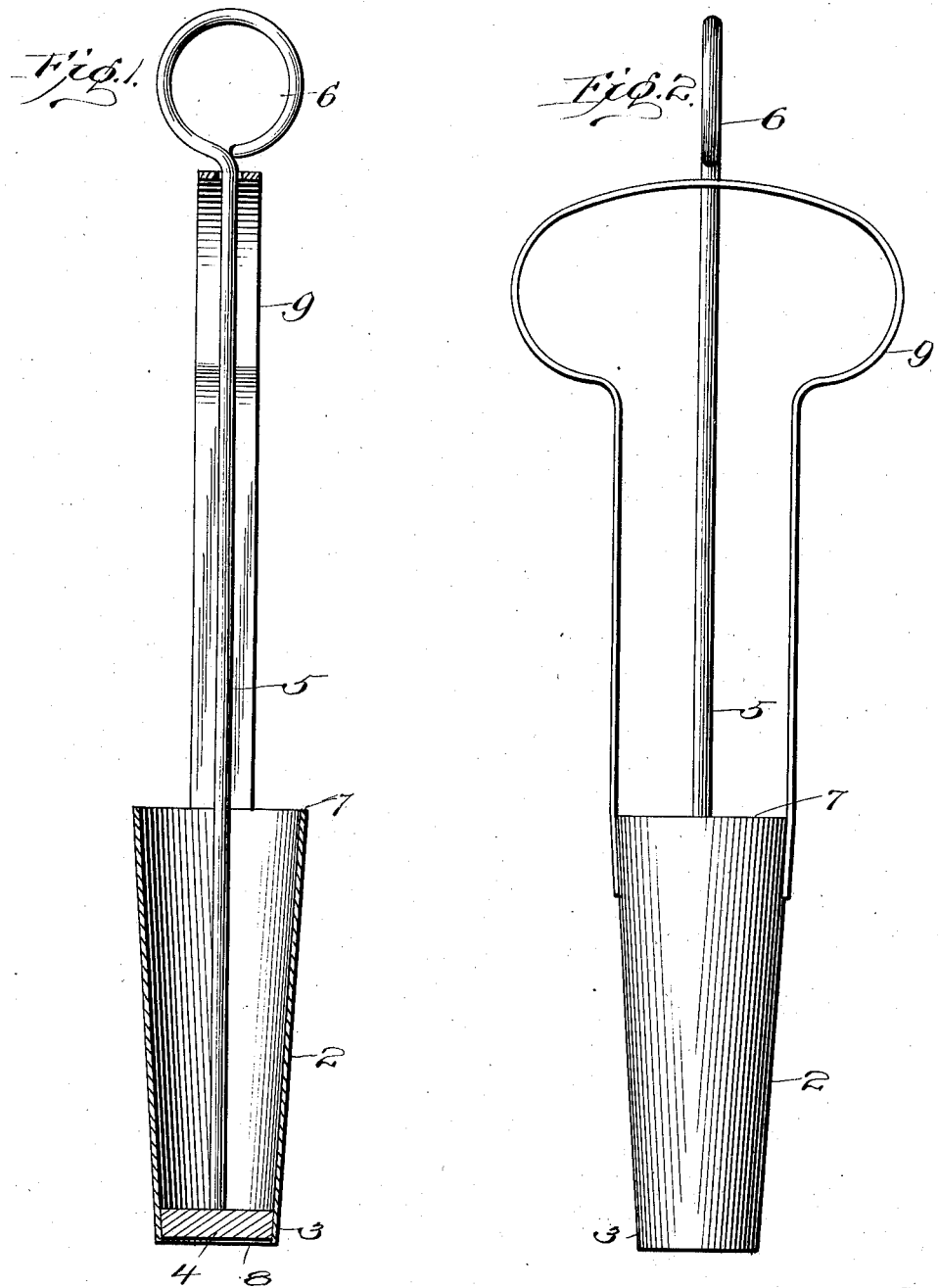

HERMAN W. PICKARD, OF OSHKOSH, WISCONSIN.

MILK-BOTTLE SKIMMER.

No. 845,706. Specification of Letters Patent. Patented Feb. 26, 1907.

Application filed February 12, 1906. Serial No. 300,795.

*To all whom it may concern:*

Be it known that I, HERMAN W. PICKARD, a citizen of the United States, residing at the city of Oshkosh, in the county of Winnebago and State of Wisconsin, have invented new and useful Improvements in Milk-Bottle Skimmers, of which the following is a specification.

My invention relates to an appliance for skimming milk from bottles.

Milk is now usually delivered to the consumer in bottles; and my invention provides a means for skimming the cream from the milk while in the bottle. It is ordinarily impossible to introduce an appliance into the bottle without displacing the milk so that it will run over the top of the bottle. Bottles are usually filled nearly full.

My apparatus provides a skimmer adapted to admit cream either at the top or the bottom at the option of the operator.

In the accompanying drawing, Figure 1 illustrates a vertical section of my invention, and Fig. 2 is a side view.

Referring to the drawings by numerals, the container 2 comprises a tapered or conoidal hollow shell, having its lower end 3 the smaller and provided with a valve member 4, disposed within the container and proportioned to fit and close the opening 8 in the lower smaller end of the container. The upper end 7 of the container is the larger and is provided with a handle portion 9, secured diametrically upon opposite sides of the container and extending upwardly from the said end 7 in substantial parallelism and formed with an enlarged or bowed portion at the top, integral with the parallel side portions.

The valve member 4 is provided with a stem 5, extending upwardly through the container 2 and between the parallel side portions of the handle 9 and through an opening formed in the upper bowed portion of the handle in alinement with the axis of the container 2. The stem 5 having passed through the upper portion of the handle 9, is provided with a ring or finger-engaging portion 6 upon the outer and upper side of the said handle and in position to permit the insertion of the finger when the remaining fingers grasp the bowed portion of the handle.

In a bottle of milk cream rises at the top. Using my invention the operator grasps the handle 9 with his fingers, inserts his thumb in the thumb-handle 6, raises the valve 4, and inserts the container in the bottle. The valve being open the cream rises in the container. This process is only for partial extraction of the cream. When the operator considers it proper, he closes the valve by lowering his thumb and withdraws the container with a small amount of cream and by raising the valve 4 with his thumb deposits the cream in any receptacle. Then he closes the bottom of the container 2 by pressing downwardly the valve 4 with his thumb and inserts the container in the bottle of milk. The insertion of the container will then not cause the milk to run over the top. The valve 4 is then closed, and the cream is allowed slowly to run over the top into the container 2 by pressing downwardly until the milk is fully skimmed. Then the container may be removed and the valve opened to deposit in any receptacle.

Having thus described my invention, what I claim, and desire to secure by Letters Patent, is—

A skimmer comprising a container tapered throughout its length, a plunger disposed within the container, and proportioned to fill and close the small end, a handle having its ends secured to the large end and extending above the container in bowed form wider than the container, a plunger-rod secured to the plunger and extending slidably upward through the handle, and a ring formed upon the upper extremity of the plunger-rod.

In testimony whereof I affix my signature in presence of two subscribing witnesses.

HERMAN W. PICKARD.

Witnesses:
WILLIAM SEARS,
A. R. WATERHOUSE.